US012126690B2

United States Patent
Romberg et al.

(10) Patent No.: US 12,126,690 B2
(45) Date of Patent: Oct. 22, 2024

(54) COMMUNICATION OF A REMOTE TERMINAL UNIT BASED ON A MODULE TYPE PACKAGE

(71) Applicant: Siemens Aktiengesellschaft, Munich (DE)

(72) Inventors: Thomas Romberg, Neulingen (DE); Andreas Stutz, Eggenstein-Leopoldshafen (DE); Martin Schneller, Stutensee (DE); Jakob Griessbaum, Rülzheim (DE); Felix Stubbe, Karlsruhe (DE); Markus Krause, Heßdorf (DE); Mathias Maurmaier, Gerlingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/229,248

(22) Filed: Aug. 2, 2023

(65) Prior Publication Data

US 2024/0048626 A1 Feb. 8, 2024

(30) Foreign Application Priority Data

Aug. 4, 2022 (EP) .................................. 22188891

(51) Int. Cl.
*H04L 67/147* (2022.01)
*H04L 67/125* (2022.01)

(52) U.S. Cl.
CPC .......... *H04L 67/147* (2013.01); *H04L 67/125* (2013.01)

(58) Field of Classification Search
CPC ........................... H04L 67/147; H04L 67/125
See application file for complete search history.

(56) References Cited

U.S. PATENT DOCUMENTS

| | | |
|---|---|---|
| 2007/0094388 A1 | 4/2007 | Talanis et al. |
| 2016/0048123 A1 | 2/2016 | Froehner et al. |
| 2022/0147039 A1 | 5/2022 | Dix et al. |

FOREIGN PATENT DOCUMENTS

| | | |
|---|---|---|
| DE | 19904331 | 8/2000 |
| EP | 2988183 | 2/2016 |
| EP | 3995920 | 5/2022 |
| WO | 2022155356 | 7/2022 |

OTHER PUBLICATIONS

VDI/VDE/Namur 2658 Part 1, Automation Engineering of Modular Systems in the Process Industry, General Concepts and Interface, pp. 1-5, Oct. 2019.
EP Search Report dated Jul. 27, 2021 based on EP22188891 filed Aug. 4, 2022.

*Primary Examiner* — Blake J Rubin
(74) *Attorney, Agent, or Firm* — Cozen O'Connor

(57) ABSTRACT

A method for generating automation for a remote terminal unit, in which automation for the remote terminal unit is generated by a computer-implemented configuration tool in conformance with specifications of the VDI/VDE/NAMUR 2658 standard, so as to subsequent communication of the remote terminal unit with a control system for an industrial plant to operate and monitor the remote terminal unit, where a data communications part of the automation is adapted to the specific requirements of communication of the remote terminal unit with external computing units, and where bidirectional communication mechanisms provided for in the VDI/VDE/NAMUR 2658 standard are each replaced by two unidirectional communication mechanisms.

10 Claims, 1 Drawing Sheet

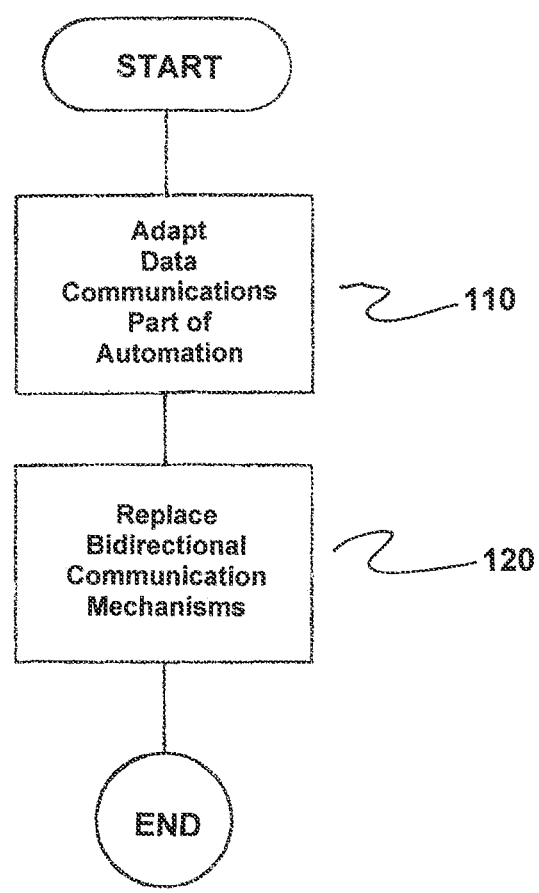

COMMUNICATION OF A REMOTE TERMINAL UNIT BASED ON A MODULE TYPE PACKAGE

BACKGROUND OF THE INVENTION

1. Field of the Invention

The invention relates to a method for generating automation for a remote terminal unit. Moreover, the invention relates to a method for operating a function module in an industrial plant. Moreover, the invention relates to a computer-implemented configuration tool, an engineering station server, a control system for an industrial plant, and a computer-readable medium.

2. Description of the Related Art

In automation technology, actuators/sensors required for control systems and decentralized peripheral solutions are connected to inputs or outputs via terminals using input/output modules. In the case of series-produced machines or larger quantities of the same structures or structural variants, this results in a high level of work and testing. In such cases, it is advantageous not to tap the signals at the terminals of the control device, but to connect them via plug-in connectors and, for example, preassembled cables. However, this requires the control system to output or receive the signals directly on a customer-specific or application-specific printed circuit board. The printed circuit board in turn has interfaces or plug-in connectors for the application-specific automation.

Critical infrastructure systems such as distribution networks for water, heat, power, gas and hydrogen make particular demands of automation engineering as regards space, because of the need for availability and the great distances over which they extend. These networks comprise pipelines that connect decentralized distribution centers to one another over hundreds of kilometers and hence create a mesh network of distribution centers and connection lines.

Operating parameters are checked and manipulated at stations along the pipelines and at termination points. These stations are system-related and are automated such that they do not need any personnel on site. For operation and monitoring of these systems, they are connected up to a central control and monitoring system. The systems are also called remote terminal units or RTUs.

These remote terminal units are usually a long way away from populated areas, and so communication with them is not always reliable. For the purpose of connecting up such remote terminal units, special telecontrol protocols, constructed to meet the requirements for robustness for connecting up remote terminal units, have been established.

In the past, integrating such remote terminal units played a relatively subordinate part in infrastructure projects. It is not at all rare for project planning steps in this sector to be carried out manually, since the operating time has always lasted a multiple of the time needed for the project. In the last few years, however, discussions surrounding the switch to using renewable energy have increasingly drawn attention to the problem that many infrastructure projects take too long after gaining planning permission and construction approval. The need for harmonization, and the standardization of interfaces, for the purpose of optimizing the options for integration, will play a more and more important part in the future. The photovoltaic industry, the hydrogen industry and energy-transmission system service providers are also including this requirement in their current research roadmaps.

Today's integration workflows in infrastructure projects that relate to remote terminal units are usually manual or only partly automated processes. The scope of such integration extends from individual data points to operating screens and alarms. Because of the large proportion of manual input, it is not possible to completely eliminate errors during integration. For this reason, comprehensive testing is required for each integrated remote terminal unit.

SUMMARY OF THE INVENTION

It is an object of the present invention to simplify the communication of a remote terminal unit with a system for the operation and monitoring of the remote terminal unit.

This and other objects and advantages are achieved in accordance with the invention by a method for generating automation for a remote terminal unit, in which automation for the remote terminal unit is generated by a computer-implemented configuration tool in conformance with the specifications of the VDI/VDE/NAMUR 2658 standard, so as to enable subsequent communication of the remote terminal unit with a control system for an industrial plant for the operation and monitoring of the remote terminal unit, where a data communications part of the automation is adapted to the specific requirements of communication of the remote terminal unit with external computing units, and where bidirectional communication mechanisms provided for in the VDI/VDE/NAMUR 2658 standard are each replaced by two unidirectional communication mechanisms.

The industrial plant may be a plant from the processing industry, such as a chemical, pharmaceutical or petrochemical plant, or a plant from the food and drinks industry. The plant also comprises any kind of industrial plants from the production industry, factories in which, for example, cars or goods of all kinds are produced. The term "industrial plant" also comprises wind turbines, solar installations or power stations for energy generation.

The term "automation" here is understood to mean the autonomous (automated) detection and manipulation of physical variables with the aid of technical devices, in this case the devices of the remote terminal unit. Automation comprises at least a parameterization of the components of the remote terminal unit and an interaction of the remote terminal unit with an external computing unit, such as a control system of an industrial plant. The remote terminal unit is a self-contained technical unit that may be integrated into communication with a higher control level of the control system.

The remote terminal unit may comprise any desired combination of individual control elements, sensors or automation components. Moreover, software mapping of, for example, individual control elements may also be part of the remote terminal unit.

Automation is generated by a computer-implemented configuration tool. An example of this is the Totally Integrated Automation Portal (TIA Portal) from Siemens. Here, automation is generated such that the generated automation meets the specifications of the VDI/VDE/NAMUR 2658 standard. This particularly means that a data structure of the automation, and rules for communication with external communication partners are in accordance with the specifications of the VDI/VDE/NAMUR 2658 standard. The specifications that had already been published as at the application date apply here. In this context, the VDI/VDE/NAMUR 2658 standard describes Module Type Packages (MTPs), which serve to describe automation for self-contained, modular technical units.

Automation of the remote terminal unit has a data communications part, which serves to specify a data exchange with external communication partners of the remote terminal unit. In accordance with the invention, the bidirectional communication mechanisms provided for in the VDI/VDE/NAMUR 2658 standard are each replaced by two unidirectional communication mechanisms. Commercially available communication mechanisms that hitherto have been used for the communication of remote terminal units utilize unidirectional communication mechanisms to transfer information from the remote terminal unit to a system for operation and monitoring. The reverse direction of transfer in this context is difficult with remote terminal units because of the frequently harsh operating conditions, and for this reason the specification of bidirectional communication is not necessary.

The invention solves the problem of reconciling commercially available communication mechanisms for remote terminal units with the bidirectional nature of the communications part of the VDI/VDE/NAMUR 2658 standard, and therefore simplifies communication of a remote terminal unit with a system for the operation and monitoring of the remote terminal unit.

Preferably, the data communications part of the automation is adapted to the requirements of the IEC 60870-5-104 standard, in which the bidirectional communication mechanisms are replaced by unidirectional telegrams in conformance with the International Electrotechnical Commission (IEC) 60870-5-104 standard.

The previously generated automation may be transferred automatically to the remote terminal unit by the computer-implemented configuration tool so that the remote terminal unit can then be operated properly.

Here, communication with the control system for the operation and monitoring of the remote terminal unit may be set up with the aid of the generated automation that has been transferred to the remote terminal unit.

The configuration tool may be part of the control system. However, it may also be separate, independent technical items of apparatus. Here, the configuration tool may be used, for example, by a manufacturer of the remote terminal unit, while an owner of an industrial plant in which information on the remote terminal unit is collected and used may utilize the control system for operation and monitoring (among other things of the remote terminal unit).

The objects and advantages in accordance with the invention are moreover achieved by a computer-implemented configuration tool that is constructed to implement the method in accordance with the invention.

The objects and advantages in accordance with the invention are moreover achieved by an engineering station server on which a configuration tool of this kind is implemented by computer.

The objects and advantages in accordance with the invention are moreover achieved by a control system for an industrial plant, where the control system is constructed to operate and monitor at least one remote terminal unit, where the control system is constructed to integrate the automation that is generated (as explained above) for the operation and monitoring of the remote terminal unit.

The objects and advantages in accordance with the invention are further achieved by a computer-readable medium, comprising program commands which, when executed by a process of a computer, cause the computer to implement the method in accordance with disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of a modularly assembled automation system with its components, in which:

The FIGURE shows a flowchart of the method in accordance with the invention.

DETAILED DESCRIPTION OF THE EXEMPLARY EMBODIMENTS

The FIGURE is a flowchart of the method for generating automation for a remote terminal unit, where automation for the remote terminal unit is generated by a computer-implemented configuration tool in accordance with specifications of the VDI/VDE/NAMUR 2658 standard, to enable subsequent communication of the remote terminal unit with a control system for an industrial plant for operating and monitoring the remote terminal unit.

The method comprises adapting a data communications part of the automation is to the specific requirements of communication of the remote terminal unit with external computing units, as indicated in step 110.

Next, each bidirectional communication mechanism provided for in the VDI/VDE/NAMUR 2658 standard is replaced by two unidirectional communication mechanisms, as indicated in step 120.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for generating automation for a remote terminal unit, automation for the remote terminal unit being generated by a computer-implemented configuration tool in accordance with specifications of the VDI/VDE/NAMUR 2658 standard, to enable subsequent communication of the remote terminal unit with a control system for an industrial plant for operating and monitoring the remote terminal unit, the method comprising:

adapting a data communications part of the automation to specific requirements of communication of the remote terminal unit with external computing units; and replacing each bidirectional communication mechanism provided for in the VDI/VDE/NAMUR 2658 standard by two unidirectional communication mechanisms.

2. The method as claimed in claim 1, wherein the data communications part of the automation is adapted to the requirements of International Electrotechnical Commission (IEC) standard 60870-5-104, and wherein the bidirectional communication mechanisms are replaced by unidirectional telegrams in accordance with the IEC 60870-5-104 standard.

3. The method as claimed in claim 1, wherein the generated automation is transferred to the remote terminal unit.

4. The method as claimed in claim 2, wherein the generated automation is transferred to the remote terminal unit.

5. The method as claimed in claim 3, wherein communication with the control system to operate and monitor the remote terminal unit is set up with the aid of the generated automation which has been transferred to the remote terminal unit.

6. A computer-implemented configuration tool which is constructed to perform the method as claimed in claim 1.

7. An engineering station server on which the configuration tool as claimed in claim 5 is implemented by computer.

8. A control system for an industrial plant, which is constructed to operate and monitor at least one remote terminal unit, wherein the control system is constructed to integrate the automation that is generated as claimed in claim 1 to operation and monitor the remote terminal unit.

9. A non-transitory computer-readable medium encoded with program commands which, when executed by a processor of computer, cause the computer to generate automation for a remote terminal unit, the program commands comprising:

program instructions for adapting a data communications part of the automation is to the specific requirements of communication of the remote terminal unit with external computing units; and program instruction for replacing each bidirectional communication mechanism provided for in a VDI/VDE/NAMUR 2658 standard by two unidirectional communication mechanisms.

10. A non-transitory computer-readable medium encoded with program commands which, when executed by a processor of computer, cause the computer to generate automation for a remote terminal unit, the program commands comprising:

program instructions for adapting a data communications part of the automation to specific requirements of communication of the remote terminal unit with external computing units;

program instructions for replacing each bidirectional communication mechanism provided for in a VDI/VDE/NAMUR 2658 standard by two unidirectional communication mechanisms;

program instructions for transferring the generated automation to the remote terminal unit; and program instructions for setting up communication with a control system aided by the generated automation to operate and monitor the remote terminal unit.

* * * * *